United States Patent
Graves et al.

(10) Patent No.: US 11,383,830 B2
(45) Date of Patent: Jul. 12, 2022

(54) VERTICAL TAKE-OFF AND LANDING (VTOL) AIRCRAFT WITH ROTOR CONFIGURATIONS TOLERANT TO ROTOR FAILURE

(71) Applicant: EMBRAER S.A., São José dos Campos CEP-SP (BR)

(72) Inventors: Julio Cesar Graves, São José dos Campos-SP (BR); Alberto Dei Castelli, São José dos Campos-SP (BR); Jose Roberto Ferreira de Camargo Clark Reis, São José dos Campos-SP (BR); Rodrigo Takashi Lourenço Kawasaki, São José dos Campos-SP (BR)

(73) Assignee: EVE UAM, LLC, Wilmington, DE (US)

( * ) Notice: Subject to any disclaimer, the term of this patent is extended or adjusted under 35 U.S.C. 154(b) by 154 days.

(21) Appl. No.: 16/391,401

(22) Filed: Apr. 23, 2019

(65) Prior Publication Data

US 2019/0329880 A1  Oct. 31, 2019

Related U.S. Application Data

(60) Provisional application No. 62/664,417, filed on Apr. 30, 2018.

(51) Int. Cl.
*B64C 29/00* (2006.01)
*B64C 9/04* (2006.01)
*B64C 27/26* (2006.01)

(52) U.S. Cl.
CPC ............ *B64C 29/0025* (2013.01); *B64C 9/04* (2013.01); *B64C 27/26* (2013.01)

(58) Field of Classification Search
CPC ... B64C 29/0025; B64C 29/0016; B64C 9/04; B64C 27/20; B64C 27/26
See application file for complete search history.

(56) References Cited

U.S. PATENT DOCUMENTS

| | | | |
|---|---|---|---|
| 6,293,491 B1 * | 9/2001 | Wobben ................. | B64D 27/24 244/17.23 |
| 2004/0245374 A1 * | 12/2004 | Morgan .............. | B64C 29/0025 244/12.3 |
| 2012/0119016 A1 * | 5/2012 | Shaw ...................... | B64C 27/20 244/12.3 |
| 2013/0062455 A1 * | 3/2013 | Lugg ................... | B64C 29/0025 244/12.3 |

(Continued)

*Primary Examiner* — Tye William Abell
(74) *Attorney, Agent, or Firm* — Nixon & Vanderhye P.C.

(57) ABSTRACT

Vertical take-off and landing (VTOL) aircraft include a fuselage having a center of gravity (CG) and defining mutually orthogonal X-, Y- and Z-axes. An even number of positionally mirror imaged port and starboard side rotors are provided laterally of the fuselage in spaced relationship to a plane established by the XZ axes while an even number of fuselage rotors are positioned along an X-axis centerline of the fuselage. Improved stability during failure of an engine/motor/rotor is achieved by causing one-half of the side rotors to rotate in one direction about the Z-axis and a remaining one-half of the side rotors rotate in a counter direction relative thereto, while one-half of the fuselage rotors rotate in one direction about the Z-axis and a remaining one-half of the fuselage rotors rotated in a counter direction relative thereto.

3 Claims, 1 Drawing Sheet

(56) References Cited

U.S. PATENT DOCUMENTS

| | | | |
|---|---|---|---|
| 2016/0311529 A1* | 10/2016 | Brotherton-Ratcliffe | ................... B64C 27/30 |
| 2018/0105268 A1* | 4/2018 | Tighe | ................... B64D 13/006 |
| 2018/0215465 A1* | 8/2018 | Renteria | ................. B64C 25/10 |
| 2018/0257772 A1* | 9/2018 | Bernhardt | ............. B64C 35/008 |
| 2019/0106206 A1* | 4/2019 | Shi | ......................... B64C 11/001 |
| 2019/0112039 A1* | 4/2019 | Pfaller | ...................... B64C 3/14 |
| 2019/0291860 A1* | 9/2019 | Morgan | ................. B64C 27/30 |
| 2019/0315471 A1* | 10/2019 | Moore | ................. B64D 11/003 |
| 2020/0108919 A1* | 4/2020 | Sada | ....................... B64C 27/02 |
| 2020/0339255 A1* | 10/2020 | Yoeli | ...................... B64C 27/26 |

* cited by examiner

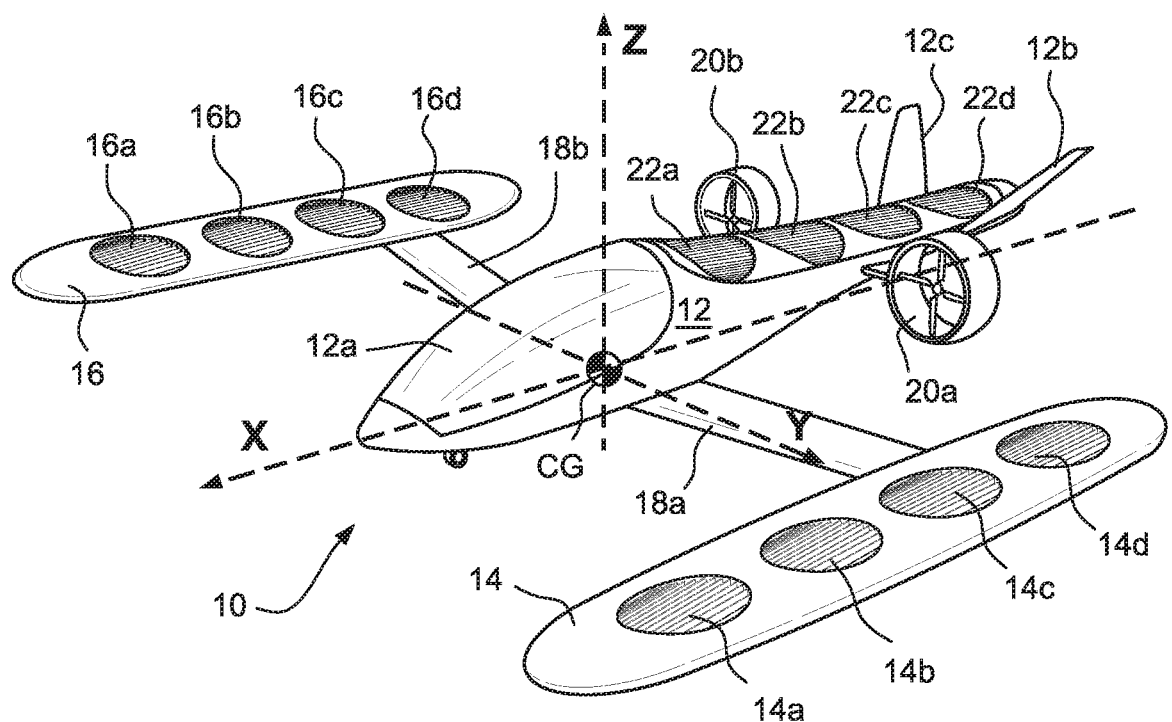

VERTICAL TAKE-OFF AND LANDING (VTOL) AIRCRAFT WITH ROTOR CONFIGURATIONS TOLERANT TO ROTOR FAILURE

CROSS-REFERENCE TO RELATED APPLICATION

This application is based on and claims domestic priority benefits from U.S. Provisional Application Ser. No. 62/664,417 filed on Apr. 30, 2018, the entire contents of which are expressly incorporated hereinto by reference.

FIELD

The embodiments disclosed herein relate generally to vertical take-off and landing (VTOL) aircraft. According to certain embodiments, VTOL aircraft are provided which address loss of engine (e.g., one engine inoperative (OEI)) scenarios to thereby meet certifiable standards in terms of safe stability and control requirements.

BACKGROUND

Wingborn flight is a challenge and its achievement has been inhibited by the lack of power-to-weight ratios associated with internal combustion engines available in the first decades of the $20^{th}$ century. Vertical flight poses an even greater challenge and the need for extreme overall system efficiencies in order to sustain a thrust-born flight, takeoff and landing.

The classical solution which is currently accepted by those in this art is the traditional helicopter which typically includes one large main rotor for lift generation and a smaller rotor to counteract main rotor torque to achieve stabilization. Other stable configurations include two main rotors rotating in opposite directions, although the use of such multiple main rotors is less common and limited to specific missions and scenarios (e.g., the Chinook helicopter in the inventory of the US Army).

Currently, helicopters (and other VTOL aircraft) are usually powered by one or more internal combustion engines (either reciprocating or turbo-shaft), that provide power transmitted to the rotors through gearboxes. With the advent of new and improved electrical powertrains, it is increasingly becoming possible to use a so-called "distributed propulsion" concept, which imposes advantages for multi-copters in particular scenarios.

Trimmed flight is required for any aircraft. An aircraft is said to be trimmed when it achieves equilibrium (i.e., sum of forces and moments are equal to zero) without pilot input. Currently, fly-by-wire (FBW) systems can provide auto-trim functionality. In order to meet operational and certification requirements, an aircraft must be capable of being trimmed and controlled even in an aerodynamic destabilizing effect associated with an engine/motor failure event.

For the specific case of multi-copters, the operational and certification requirements imply that after the loss of one engine/motor/rotor, the sum of moments and forces will continue to add up to zero, so the static equilibrium is obtained. Unfortunately, sum of moments and forces is only part of the problem since controllability and stability are also relevant in such a scenario. Maintaining both controllability and stability throughout the entire flight, even during and after an engine/motor/rotor failure, is also a challenge.

Each rotor of a multi-copter not only provides lift but also provides control. As such, it is possible to have more control actuators (rotors) than states to be controlled (degrees of freedom). A technical solution to the problem therefore relies on the design and placement of the rotors in such a way that the overall rotor configuration is able to meet the control and stability requirements of an inoperative engine/motor/rotor event. The combination of the number of rotors and the positional placement of the rotors provides for multiple possible solutions. For example, hexa-copters may be provided with different rotor displacement to in turn provide different degrees of controllability, stability, and performance characteristics during both normal operation or even during a rotor failure.

Thus, the technical problem to be addressed is that many multi-copter configurations are not capable of remaining stable and controllable in the event of a rotor or motor failure which in turn poses safety, operational and certification challenges for multi-copters intended to carry important loads or people. It is also important to note that for multi-copters, rotors generate lift, but also generate torque. As noted previously, the tail rotor of conventional helicopters counters such torque. In multi-copters, however, all rotors must generate enough force to sustain flight, but also to provide a sum of torques in Z-axis (yaw) that must be zero.

It would therefore be desirable if an aircraft could be provided having VTOL capability which solves the technical problems noted hereinabove. It is towards providing such a solution that the embodiments disclosed herein are directed.

SUMMARY

Broadly, the embodiments disclosed herein are directed toward VTOL aircraft (e.g., a multi-copter configuration) in which rotor displacement is such that, for any given single rotor failure, the aircraft remains controllable and stable, hence certifiable and safely operable.

The embodiments disclosed herein will include a Y-axis (pitch) configuration for vertical take-off and landing aircraft, with a symmetric number of side rotors positioned laterally of the fuselage. Thus, for each of the side rotors there is a specular (mirrored) side rotor from XZ-plane perspective. One-half of the side rotors will moreover be rotational in an opposite direction as compared to the remaining half of the side rotors. These side rotors can thereby generate moments about the Y-axis (pitch) as well as about the X-axis (roll).

In addition to the side rotors, the embodiments disclosed herein will necessarily include an even number of fuselage rotors aligned and centered along the centerline of the fuselage in such a way that the fuselage rotors are not capable of generating moments around the X-axis (roll). One-half of such fuselage rotors will be rotational in a direction which is opposite to the rotational direction of the other half of the fuselage rotors.

Propulsive rotors may optionally be provided. For example, certain embodiments may include at least one propulsive rotor aligned with the X-axis of the aircraft which is capable of generating forward and reverse thrust along such X-axis. The propulsive rotor(s) may for example be embodied in variable (thus reversible) pitch propellers.

A conventional airfoil wing may be provided in certain embodiments to provide lift during cruise flight. During such a phase of flight, the side and fuselage rotors can be effectively feathered and operated when necessary only for aircraft control. The rotor positioning is therefore such that it allows force and moments, even during engine/rotor/motor failure, that are sufficient to sustain the weight of the aircraft with the forces acting on the aircraft center of gravity (CG) with no angular acceleration. In other words, the positioning of the rotors allows the sum of moments to be zero on the Y- and X-axes.

These and other aspects and advantages of the embodiments of the present invention disclosed herein will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiment in conjunction with the drawings of which:

FIG. 1 is a schematic perspective view of a VTOL aircraft having rotor configurations tolerant to rotary/motor/engine failure.

DETAILED DESCRIPTION

Accompanying FIG. 1 schematically depicts a VTOL aircraft 10 in the form of a multi-rotor vehicle having a fuselage 12 which includes a forward cabin region for pilot and passengers which is covered by a transparent canopy 12a. The aircraft 10 has a center of gravity (CG) at the intersection of axes X, Y and Z corresponding to the roll, pitch and yaw axes of the aircraft 10. Port and starboard ruddervators 12b, 12c, respectively, located at the aft end of the fuselage 12 may be provided so as to provide direction control about the Y (pitch) and Z (yaw) axes. Conventional rudder and elevator controls may also be employed rather than the ruddervators 12b, 12c.

According to the embodiment depicted in FIG. 1, the aircraft 10 will include port and starboard side rotor pods 14, 16 which are positioned in laterally spaced apart relationship to the XZ plane. Each of the side rotor pods 14, 16 will operably contain an even number of side rotors 14a-14d and 16a-16d, respectively. Each of the side rotors 14a-14d will therefore have a corresponding side rotor 16a-16d at a mirror image location and vice versa. Moreover one-half of the even number of side rotors 14a-14d and 16a-16d will rotate in one direction about the Z-axis while the other half of the side rotors 14a-14d and 16a-16d will rotate in an opposite direction. Since the side rotors 14a-14d and 16a-16d generate moments around the X-axis, the counter-rotation of one-half of the side rotors 14a-14d and 16a-16d thereby allow the sum of moments about the Y- and X-axes to be zero. At least two of the positionally mirror-imaged side rotors 14a-14d and 16a-16d are situated forwardly of the CG of the aircraft 10.

Aerodynamic port and starboard wings 18a, 18b may project laterally from the fuselage 12 and serve to structurally join the rotor pods 14, 16 to the fuselage, respectively. The wings 18a, 18b serve to provide aerodynamic lift during propulsive flight of the aircraft 10 in the direction of the X-axis. In order to achieve propulsive flight of the aircraft 10 in the direction of the X-axis (both forwardly and rearwardly), a pair of port and starboard ducted rotors 20a, 20b, respectively, can be positioned laterally of the fuselage at an aft position rearwardly of the CG of the aircraft 10.

The aircraft 10 will also include an even number of fuselage rotors 22a-22d positioned along the X-axis centerline of the fuselage 12 aft of the aircraft's CG. Each of the fuselage rotors 22a-22d will generate moments about the X-axis. One-half of the even number of fuselage rotors 22a-22d will rotate in one direction about the Z-axis while the other half of the fuselage rotors 22a-22d will rotate in an opposite direction.

Each of the rotors 14a-14d, 16a-16d and 22a-22d may be ducted rotors to develop directional force (upward/downward) of desired magnitude along the Z-axis. As such, controllably altering the amount and/or direction of the thrust of the rotor pairs 14a-14d, 16a-16d and/or 22a-22d will therefore allow the aircraft 10 to be maneuvered during flight operations relative to the X-, Y- and Z-axes as may be desired to effect VTOL performance as well as propulsive flight performance. Moreover, the rotor positioning and counter-rotation of the pairs of rotors 14a-14d, 16a-16d and 22a-22d will serve to allow the force and moments to be zero summed on the Y- and X-axes to thereby improve aircraft stability even during an engine/motor/rotor failure.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:
1. A vertical take-off and landing (VTOL) aircraft comprising:
 a fuselage which includes a cabin section, the fuselage having a center of gravity (CG) and defining mutually orthogonal X-, Y- and Z-axes passing through the CG, wherein the X-axis defines a longitudinal centerline roll axis of the fuselage, the Y-axis defines a pitch axis of the fuselage and the Z-axis defines a yaw axis of the fuselage;
 rotorless port and starboard aerodynamic wings extending laterally outwardly from port and starboard sides of the fuselage, respectively;
 port and starboard rotor pods positioned at terminal ends of the rotorless port and starboard aerodynamic wings, respectively, wherein the port and starboard rotor pods are respectively aligned with port and starboard lateral planes parallel to but spaced laterally from a central plane established by the XZ axes;
 single port and starboard rotor columns each comprised of an even number of positionally mirror imaged ducted port and starboard side rotors positionally aligned within the port and starboard rotor pods such that the ducted port and starboard side rotors respectively forming each of the single port and starboard rotor columns is aligned with the respective port and starboard lateral planes so as to be parallel to but spaced laterally from the central plane established by the XZ axes;
 an even number of fuselage rotors positioned along the longitudinal centerline roll axis of the fuselage aft of the fuselage CG, wherein a first one-half set of the fuselage rotors rotates in one direction about the Z-axis and a second one-half set of the fuselage rotors rotates in a direction about the Z-axis which is opposite to the first one-half set;
 port and starboard propulsive rotors each providing thrust along the X-axis of the fuselage, wherein each of the port and starboard propulsive rotors are ducted and extend laterally outwardly from the fuselage at a position rearwardly midway between the even number of fuselage rotors aft the CG of the fuselage; and wherein one-half of the side rotors rotate in one direction about an axis parallel to the Z-axis and a remaining one-half of the side rotors rotate in a counter direction relative thereto.

2. The VTOL aircraft according to claim 1, further comprising ruddervators at an aft portion of the fuselage.

3. The VTOL aircraft according to claim 1, wherein at least some of the even number of side rotors are positioned forward of the CG of the aircraft.

* * * * *